United States Patent [19]

Fortez et al.

[11] Patent Number: 5,245,141
[45] Date of Patent: Sep. 14, 1993

[54] SOUND-INSULATING AND SOUND-DAMPING COMPOSITE STRUCTURE

[75] Inventors: Maurice Fortez, Vanves, France; Thorsten Alts, Gross-Bieberau; Peter Ehrler, Reinheim, both of Fed. Rep. of Germany

[73] Assignee: Matec Holding AG, Kusnacht, Switzerland

[21] Appl. No.: 751,835

[22] Filed: Aug. 30, 1991

[30] Foreign Application Priority Data

Sep. 3, 1990 [CH] Switzerland ............... 2844/90

[51] Int. Cl.$^5$ .................................... E04B 1/82
[52] U.S. Cl. .............................. 181/288; 181/290
[58] Field of Search ............ 181/288, 290, 291, 292, 181/293

[56] References Cited

U.S. PATENT DOCUMENTS

| | | | |
|---|---|---|---|
| 4,340,129 | 7/1982 | Salyers | 181/288 |
| 4,867,271 | 9/1989 | Tschuclin-Mahrer | 181/290 |
| 5,057,176 | 10/1991 | Bainbridge | 181/288 |

FOREIGN PATENT DOCUMENTS

| | | |
|---|---|---|
| 1506287 | 4/1978 | Fed. Rep. of Germany . |
| 3623789 | 1/1988 | Fed. Rep. of Germany . |
| 3832583 | 4/1989 | Fed. Rep. of Germany . |

OTHER PUBLICATIONS

The Patent Office Japanese Government "Patent Abstracts of Japan," Mar. 31, 1987 and JP-A-61 249853 (Mazda Motors Corp.) (Nov. 7, 1986).

*Primary Examiner*—Michael L. Gellner
*Assistant Examiner*—Eddie C. Lee
*Attorney, Agent, or Firm*—Mason, Fenwick & Lawrence

[57] ABSTRACT

A composite structure with sound-insulating and sound-damping effects for use on the interior surfaces of motor vehicles, comprising at least two groups of coatings resting loosely on one another. In particular, the first group consists of a bottom part (2) free to vibrate and provided with coatings (6) or a finish like that used in modern motor vehicle construction. Preferably the applied second group of coatings consists of an insulating coating (8, 9). This insulating coating can be provided with an additional protective layer (7) and/or a textile or textile-like decorative layer (5). According to the invention, insulating coating (8, 9) exhibits anisotropic air flow resistance. This is achieved in simple fashion by a carrier layer (9) with a geometric structure and a plurality of support 15 elements (13). These support elements (13) are formed essentially of narrow ribs and are arranged to form a complex cavity labyrinth in conjunction with the first group of coatings and thus permit lateral air flow with low flow resistance.

20 Claims, 3 Drawing Sheets

SOUND-INSULATING AND SOUND-DAMPING COMPOSITE STRUCTURE

The present invention relates to a sound-insulating and sound-damping composite structure for reducing noise in motor vehicle construction, with at least one bottom part capable of vibration and an open-pored insulating coating, as well as an insulating coating for a composite structure of this kind.

Sound-insulating composite structures of this design made of porous materials are used in automobile and motor vehicle construction, in which floor panels, end walls, trunks, etc. are provided with composite structures of this kind to reduce the level of the noise generated by these body parts.

Measures for reducing sound emissions in motor vehicle interiors are especially important since the adverse effects created by noise are known to lead to subjective unwellness, for example headache, heart palpitations, or elevated blood pressure. Hence, modern automobile companies are endeavoring to reduce the noise level of vehicles as much as possible.

Known measures for reducing the noise level generated by vibrating body parts are essentially limited to two measures:

stiffening and damping the body parts in question by means of bending-resistant, lossy damping films glued or melted in place;

covering damped or exposed body parts with a sound-insulating coating made of porous and elastic material (fleece or foam) with a heavy layer attached thereto.

Usually this coating is sealed off from the interior of the motor vehicle by a decorative or carpet layer.

These conventional commercial sound-insulation systems have inherent admittances due to resonance with correspondingly poor sound insulation in the ranges of the second and third harmonic frequencies of the engine forces and torques, in other words in the frequency ranges of maximum noise generation.

Hence the goal of the present invention is to provide a sound-insulating and sound-damping composite structure which does not suffer from the disadvantages of known sound-insulating systems.

In particular, it is the goal of the present invention to provide a sound-insulating and sound-damping composite structure that does not exhibit these resonance-caused admittances. Additional goals of the present invention consist in providing a composite structure that is less expensive to assemble than conventional composite structures and will not contaminate the paint baths used in manufacturing motor vehicles, retains its sound-insulating and sound-damping effectiveness even after prolonged use, and permits simple removal.

According to the invention, this goal is achieved with a sound-insulating and sound-damping composite structure of the species recited at the outset, characterized by the insulating coating resting loosely on the bottom part and having an isotropic air flow resistance, with the air flow resistance running laterally in the direction of the coating plane being less than the transverse air flow resistance running in the thickness direction.

This combination of technical features creates a composite structure with an acoustic effectiveness that is much improved by comparison with conventional sound-damping measures, especially in the very disturbing frequency ranges in automobile construction. In addition, outstanding acoustic properties can be retained without increasing the thickness or weight per unit area of the composite structure.

One important advantage of the composite structure according to the invention lies in its use in automobile manufacture. Since the present composite structure is not glued or melted in place, it can be installed in the vehicle after the body is dipped in the dip bath and dried in an oven. This prevents crumbs of the damping films usually employed from contaminating the dip bath.

Another important advantage of the composite structure according to the invention becomes apparent in conjunction with the disposal of worn-out motor vehicles In contrast to the damping films usually employed, which are melted or glued onto the body parts, composite structures according to the invention can be removed from motor vehicles at no expense.

Further surprising effects and advantages will be apparent to the individual skilled in the art from the following description. By the formation of an acoustically tuned system of open cavities, channels, and ribs on the side of the porous material that faces the bottom part following installation thereon, a labyrinth of cavities and channels is created which, together with the supporting ribs, provides a much improved and frequency-optimized sound insulation than is possible with conventional insulating systems with the same weight per unit area. In particular, the composite structure according to the invention permits low-frequency tuning for the dimensions and weights usually encountered in automobile construction, so that especially good sound insulation is achieved in the ranges of the second and third harmonic frequencies of the engine forces and torques in motor vehicles with internal combustion engines. Elimination of resonance-caused admittances is the result of considerable vibration damping achieved by providing ribs that provide support in the foam or fleece foundation, as well as significant air sound dissipation during the movement of the air through the labyrinth of channels and cavities. The optimized structure of the ribs, channels, and cavities addresses material damping in the viscoelastic framework material of porous foams or in the fiber material of the fiber fleeces, and the increased air sound absorption in multiple reflection between the ribs and the cavities, especially in the low-frequency range.

Dissipative losses are created as follows according to the invention:

The ribs bear the total load of the coating on them. This results in considerable deformations in the ribs themselves and in the vicinity of the supports in the foam or fleece foundation, with shear deformations as well as compressive strains being considerably involved. At a short distance from the supports, tensile deformations even occur, with excitation vibration in the direction of the ribs (thickness direction) and major alternating deformations of the type described above being generated by the floor part beneath, especially in the vicinity of the rib supports. These result in very good vibration damping (conversion of vibration energy into heat) by viscoelastic losses in the porous structural material. These losses are much greater than when the compact porous material is applied flat to the vibrating body part, since the compact material is much less deformed because of the uniform application.

Another form of vibration damping occurs during lateral movements of the body part in the local tangential plane. Vibrations of this kind occur in bent body parts. In the composite structure according to the invention, these vibrations, with the ribs adhering to the body part, create shear deformations in the ribs and the rib supports in the foam or fleece foundation, caused by twisting of the ribs. Corresponding deformations and viscoelastic losses do not occur in the compact material of conventional sound insulating materials.

One important contribution to sound insulation is the flow losses of the air as it moves through the pore system. Internal friction, heat conduction within the air and nonelastic momentum exchange of the air with the elastic pore walls or the fibers of the open-pored material that are in the way result in partial conversion of the motion energy of the air into heat. In macroscopically isotropic open-pored materials, the totality of these losses is characterized by the specific flow resistance. This also applies to acoustic vibration of the air in the pore system. Good high-frequency sound insulation requires optimum flow resistance. Low-frequency resonance-caused admittance cannot be avoided by adjusting the so-called optimum flow resistance, however.

The present invention is based on the knowledge that the resonance-caused admittances in the isolation curve can be largely avoided if the air flow in the support plane is offered little resistance in comparison to the air flow in the thickness direction. This requires manufacture of anisotropic open-pored materials with at least two flow resistances, with the lateral flow resistance in the support plane having to be much less than the transverse flow resistance in the thickness direction. This permits utilization of an acoustic short-circuit effect that occurs inside the compound structure.

The principal source of sound radiated in motor vehicles, rail vehicles, and machinery is bending oscillations of the body panels. Pressure is generated in the anisotropic porous material located on top above the upswinging areas of the bottom parts, while a vacuum is created in the adjacent areas located above the downswinging areas. When transverse transport is not significantly impeded, there is a nearly instantaneous pressure equalization caused by the flow of the air in the contact plane. This in turn causes a much lower buildup of pressure in the air column above the upswinging areas and a reduced acceleration of the insulating layer resting in the composite structure. The same is true of the layer above the downswinging body areas. The total effect is a reduced bending acceleration of the insulating layer with correspondingly reduced sound radiation into the vehicle interior.

It has been found that the anisotropic composite structure according to the invention possesses outstanding high-frequency sound insulation and simultaneously completely eliminates resonance-caused admittance in the low-frequency range.

Production of anisotropic foams and fleeces with low flow resistance in the plane of the porous material and comparatively high flow resistance perpendicular thereto in the thickness direction has not yet been satisfactorily addressed by production techniques.

Good results are obtained according to the invention by designing a geometric structure that generates the anisotropic flow behavior essential for acoustic insulation by utilizing an acoustic short circuit. The geometric structure according to the invention, composed of complex cavities, channels, and ribs, creates the necessary effective flow anisotropy and is tuned to avoid the low-frequency resonance-caused admittance of the insulation curve of the composite structure. The ribs, open cavities, and channels are arranged so that they prevent lateral air sound propagation to some degree because of the short circuit between multiple reflection and absorption on the ribs and because the transverse effective flow resistance is comparatively high.

In addition, the following flow effect is obtained which has an additional favorable effect on the insulating behavior of the composite structure according to the invention.

Forcing the ribs into the open-pored material causes a local pressure increase in the air in the foot areas. This creates an air flow in the pore area which flows back, with detours and with a time delay, into the open chambers and channels. This functions only with open chambers and channels (which likewise are compressed by removing the effective rib height), whose pressure increase has already been reduced by the acoustic short circuit. It is clear that this additional loss mechanism does not result with closed chambers.

In addition to the above-described dissipative mechanisms produced by the design of the composite structure according to the invention, other material and system parameters must be taken into account. These include thickness d of the composite structure, its weight per unit area $m_F$, and its effective elasticity modulus E as well as shear modulus G. In addition, the geometry and dimensions of the system of open cavities, channels, and ribs is of critical importance for the frequency curve of the insulating curve.

All previous composite structures used for sound insulation are spring-weight systems in their theoretical method of operation and as such basically have resonance discontinuities in the frequency curve of the insulation curve. The resonance discontinuity that is most pronounced is always the one at the lowest natural frequency $$f_0 = \tfrac{1}{2}\pi \sqrt{E/d'm_F}$$

(where E is the elasticity modulus, d is the thickness, and $m_F$ is the mass per unit area) for simple stroke vibrations of the system.

The resonance-caused admittances of other types of vibration (such as the various bending vibrations, torsional vibrations, and shear vibrations) occur at higher frequencies and are less pronounced because of the existing material damping in the frequency curve of the insulation curve.

In automobile construction, the thickness of the entire insulating system and the application of weights are normally specified within narrow limits. Good high-frequency sound insulation can therefore only be achieved by having an elasticity modulus of the porous material (spring layer) which is as small as possible. This however creates low resonance-caused admittance of the insulation curve in the frequency environment of the stroke vibration resonance, specifically in the low-frequency range of the second and third harmonic ranges of the engine of the automobile, in other words the ranges with the largest noise contribution.

By selecting a higher E modulus, the lowest resonant frequency $f_0$ of the insulation system from the frequency range of the second and third harmonic frequencies of the engine (in automobiles, up to 300 Hz) can be shifted to the high-frequency side. This results in improved low-frequency sound insulation, but is obtained at the expense of considerable deterioration in the high-frequency range.

With the composite structure according to the invention, the above-mentioned technical procedure for optimizing the insulating systems is eliminated by virtue of the special design. By choosing a relatively hard foam or a compressed fleece with a high E modulus, the resonant frequency for "lifting vibrations" is shifted to the high-frequency range, where the damping mechanisms increased by construction compensate for the resonance-caused admittance, so that good insulation is obtained even at higher frequencies. The composite structure according to the invention for sound insulation therefore has a frequency-dependent effective E modulus (effective spring constant) that is relatively high at low frequencies and decreases sharply as the frequency rises. The causes of this lie in the special structure and design of the cavities, channels, and ribs.

The insulating composite structures tested, with highly filled open-pored and relatively stiff polyurethane foam and with surface structures on one side as well as foamed carpeting and/or a foamed PVC layer on the other side, in addition to good sound insulation because of the relatively high static E modulus, also exhibit outstanding load-carrying properties. They are therefore especially well suited for transportation vehicles in which the cargo surface must be sound-insulated. High crush resistance of these systems is also highly desirable for psychological reasons in the automobile industry.

Composite structures of this kind, made according to the invention from heavy foam, in addition to providing sound insulation when applied directly to body panels, can also make damping measures on the sheet metal itself largely unnecessary.

In one preferred embodiment, the geometric structure of the insulating coating is formed of supporting elements essentially consisting of ribs forming a triangle. Between these supporting elements, there are blocking ribs that both increase lateral airflow resistance in the cavity labyrinth and improve the mechanical stability of the carrier layer. It is understood that any arrangement of the supporting elements may be used to form the complex cavity labyrinth.

Other preferred embodiments and features of the composite structure according to the invention will be evident to the individual skilled in the art from the claims.

The present invention will now be described in greater detail with reference to embodiments and with the aid of the figures.

Figure 1:
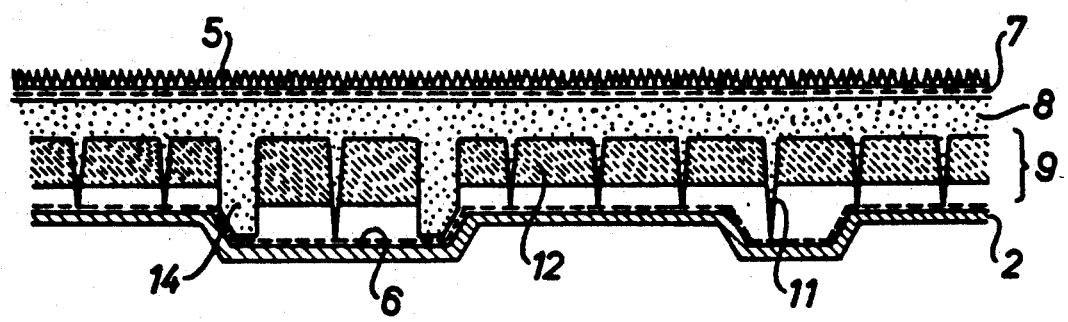
FIG. 1 is a schematic diagram of a cross section through a composite structure according to the invention.

The composite structure shown in FIG. 1 comprises a plurality of coatings which can be combined according to the invention into two groups resting loosely on one another. The first group includes a bottom part 2 that can vibrate and can be provided with coatings 6 of the type that are usual in motor vehicle construction, especially a paint coating, corrosionproofing, or a textile or textile-finish, said group according to the invention being connected in a sound-insulating and sound-damping manner with the second group of coatings.

The second group of coatings essentially comprises an insulating coating 8, 9 with anisotropic air-flow resistance. This anisotropy is such that the air excited by the first group to oscillate can flow with less hindrance in the lateral direction, while it can only flow with considerable hindrance in the thickness direction of the composite structure. The resultant effects are described in detail above. In the present view, this insulating coating comprises two layers, a carrier layer 9 and a cover layer 8. According to the invention, carrier layer 9 comprises a plurality of supporting elements 13 formed of narrow ribs 11 or of wide contact elements 14. It will now be evident to the individual skilled in the art that these support elements 13 must be dimensioned to suit the topography of the base.

In another embodiment, carrier layer 9 can have material properties different from those of cover layer 8. In particular, these layers can differ in hardness and the carrier layer can consist of a nonporous material.

In one preferred embodiment, carrier layer 9 has blocking ribs 12 running transversely to ribs 11 or application elements 14, the height of ribs 12 being less than the height of support elements 13. By varying the height of these blocking ribs 12, the anisotropy of the air-flow resistance can be adjusted optimally to the desired conditions.

An essential feature of the invention is that a complex cavity labyrinth is formed between the two groups of coatings resting loosely on one another, in other words a system composed of different channels and chambers It will be understood that individually closed chambers could be formed according to the invention, and because of the loosely applied connection and the porosity of the material, they can be viewed as parts of the complex cavity labyrinth with increased flow resistance.

In one preferred embodiment, insulating coating 8, 9 has a textile or textile-like decorative covering 5. In particular, cover layer 8 is provided with a protective layer 7.

Suitable materials for each of these layers and coatings are sufficiently known to the individual skilled in the art. In the embodiments tested, carrier layer 9 and cover layer 8 are made in one piece of highly filled relatively rigid polyurethane foam and the protective layer is made of a thin PVC film.

In other tested embodiments, a compressed fiber fleece was used for insulating coating 8, 9 as known sufficiently in the automobile industry and described for example in FR-A-2265147.

This fiber fleece essentially consists of natural animal or plant fibers, such as sheep's wool, cotton, coconut or silk fibers and can be enriched with manmade fibers. The fibers are joined together by thermosetting drops of synthetic resin. Suitable microporous water-and-oil-impermeable impregnation, like that disclosed for example in the above French patent, protects the fleece against dampness and contamination.

In particular, for the present invention, a fiber fleece of this kind with a density of 60 kg/m$^3$ and a specific air flow resistance of $1.2 \times 10^4$ Ns/m$^4$ is used, which, in a fleece 20 mm thick, corresponds to an absolute air resistance of approximately 200 Ns/m$^4$.

Figure 2:
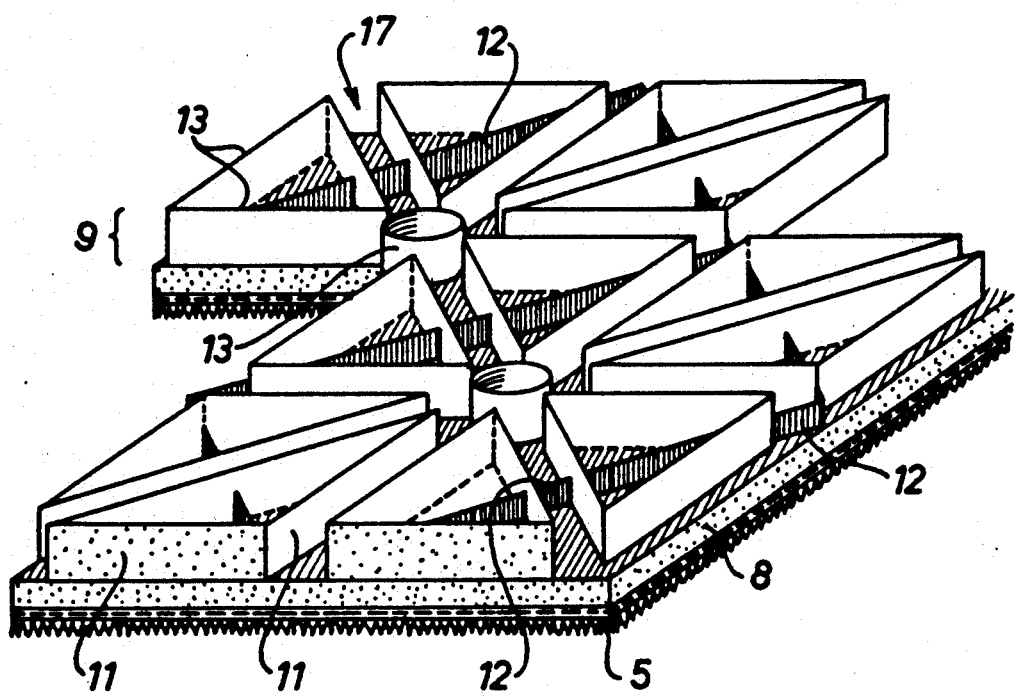
FIG. 2 is a perspective view of a schematic bottom view of the insulating coating according to the invention.

FIG. 2 shows schematically in a perspective view the underside of a coated insulating coating. Supporting elements 13, in the form of hollow prisms and hollow cylinders, are clearly evident.

In one preferred embodiment, hollow prism-shaped supporting elements 13 have a hypoteneuse edge length of 42.4 mm and a cathetus edge length of 30 mm each. The outside diameter of the hollow cylindrical supporting elements is 30 mm. The height of ribs 11 forming these supporting elements 13 is 10 mm. The cross section of these ribs 11 is preferably trapezoidal and is 3 mm wide at its base on the cover layer side while the free edge is 1.8 mm.

Although the preferred embodiment essentially shows hollow prism-shaped supporting elements 13, supporting elements 13 in the shape of a hollow square or another shape fall into the scope of technical competence of an individual skilled in the art. Such supporting elements in the form of hollow squares can have an edge length of 26 mm, for example. For processing reasons, the inner corners of supporting elements 13 are rounded to a radius of about 2 mm. FIG. 2 shows how channels 17 are formed by a suitable arrangement of supporting elements 13. In the preferred embodiment, these channels 17 are 20 mm or 14 mm wide. Blocking ribs 12 located in channels 17, whose height is less according to the invention than that of ribs 11, are also clearly evident. In the preferred embodiment, the height of these blocking ribs 12 is about 5 mm. Blocking ribs of this kind can also be located inside supporting elements 13, thereby improving the stability of carrier layer 9 and the crush resistance of the entire composite structure. It will be understood that porous carrier layer 9 and cover layer 8 consist of elastic foams, like those known to every individual skilled in the art in the field of sound insulation. In particular, both layers 8 and 9 including cross ribs 12 can be made of the same material. Open-pored highly filled and relatively stiff polyurethane foam (PUR-900) has proven especially suitable for this purpose.

The thickness of insulating coatings 8 and 9 of carrier layer 9 and cover layer 8 in a first embodiment is 15 mm. In this embodiment, a heavy foam with an effective relative density of $\rho = 630$ kg/m$^3$ was used. The weight per unit area of the entire insulating layer including protective layer 7 and decorative layer 5 was $m_F = 10.7$ kg/m$^2$.

In a second embodiment with supporting elements in the form of hollow squares, the thickness of the uncoated insulating coating is 17 mm and the effective relative density of the heavy foam (PUR-900) used is $P = 800$ kg/m$^3$. The weight per unit area of the total insulating coating 8, 9 including the carpet layer is $m_F = 14.5$ kg/m$^2$.

In another embodiment tested, a fiber fleece was used that was compressed locally to different depths. The rib width and height in this embodiment is about 4 mm, while the cavity labyrinth has channels about 16 mm wide. This fiber fleece part has a thickness of about 20 mm and has a heavy layer of about 4.5 kg/m$^2$. Comparative measurements of this embodiment with fleece applied flat show the effect of the acoustic short circuit created according to the invention:

| Density | Dynamic Modulus of Elasticity of Flat Fleece | Dynamic Elasticity Modulus of Fleece According to the Invention |
| --- | --- | --- |
| 60 kg/m$^3$ | 0.10 daN/cm$^2$ | 0.06 daN/cm$^2$ |
| 80 kg/m$^3$ | 0.38 daN/cm$^2$ | 0.25 daN/cm$^2$ |
| 130 kg/m$^3$ | 0.85 daN/cm$^2$ | 0.34 daN/cm$^2$ |

Figure 3:
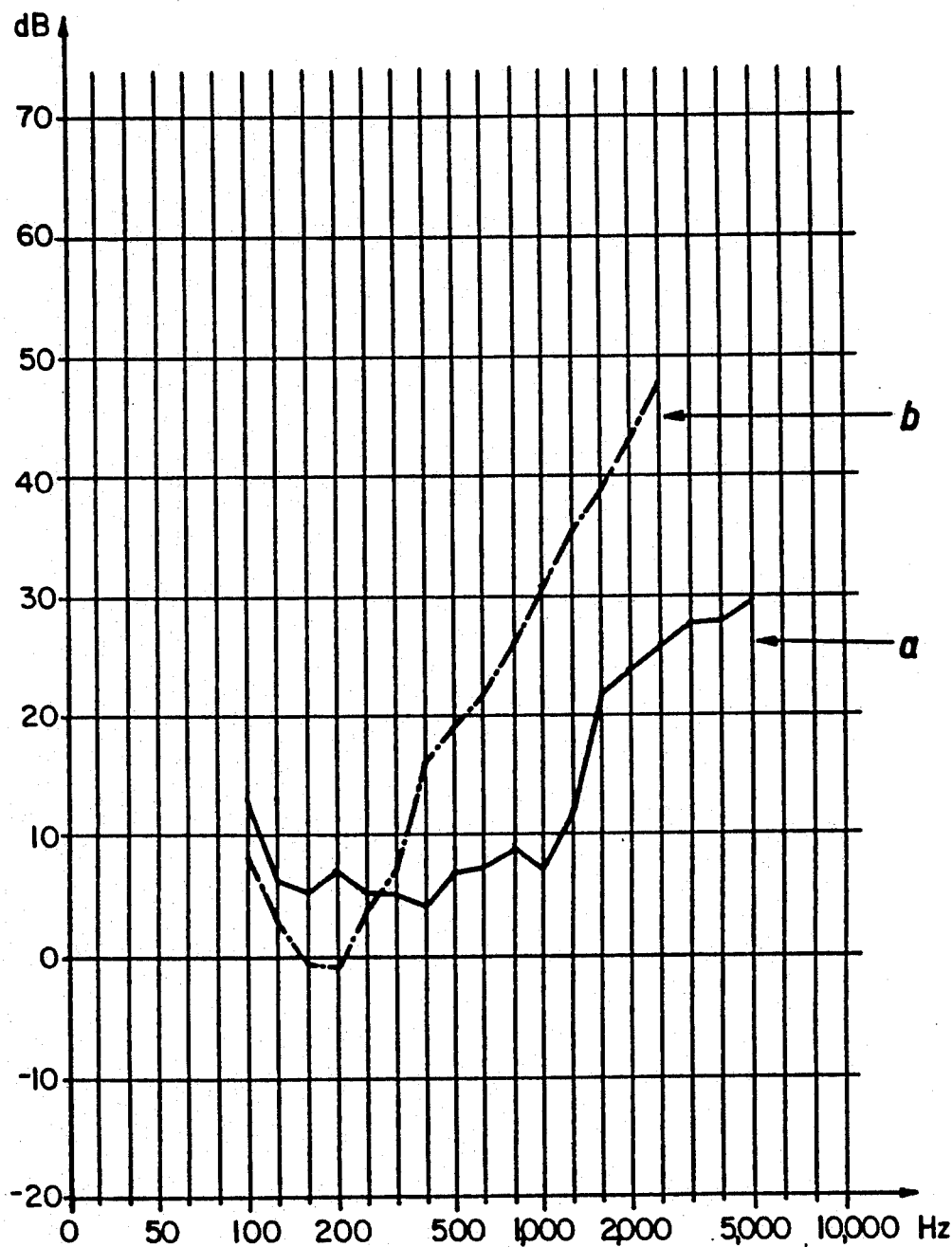
FIG. 3 shows comparative measurements of the frequency-dependent sound-insulating effect.

FIG. 3 shows the effect obtained by the composite structure according to the invention with reference to two measurement curves. Measurement curve b) shows the frequency-dependent curve of the insulating effect for a classic insulation system composed of a metal bottom plate, a fiber fleece layer glued in place, and a heavy layer fastened to the latter with a weight per unit area of 10 kg/m$^2$. The thickness of this entire classical insulation system without the carpet layer was 18 mm. This measurement curve shows the outstanding insulating effect of this system in the higher frequency range and shows a clear resonance-caused admittance at about 200 Hz. At lower frequencies, the acoustic effectiveness of this system increases once again. Curve a) on the other hand shows the frequency-dependent behavior of a composite structure according to the invention made of heavy foam and with a weight per unit area of 9.8 kg/m$^2$.

Surprisingly, although the weights per unit area of these two insulation systems are comparable, the above-mentioned resonance-caused admittance definitely no longer occurs with the composite structure according to the invention.

Figure 4:
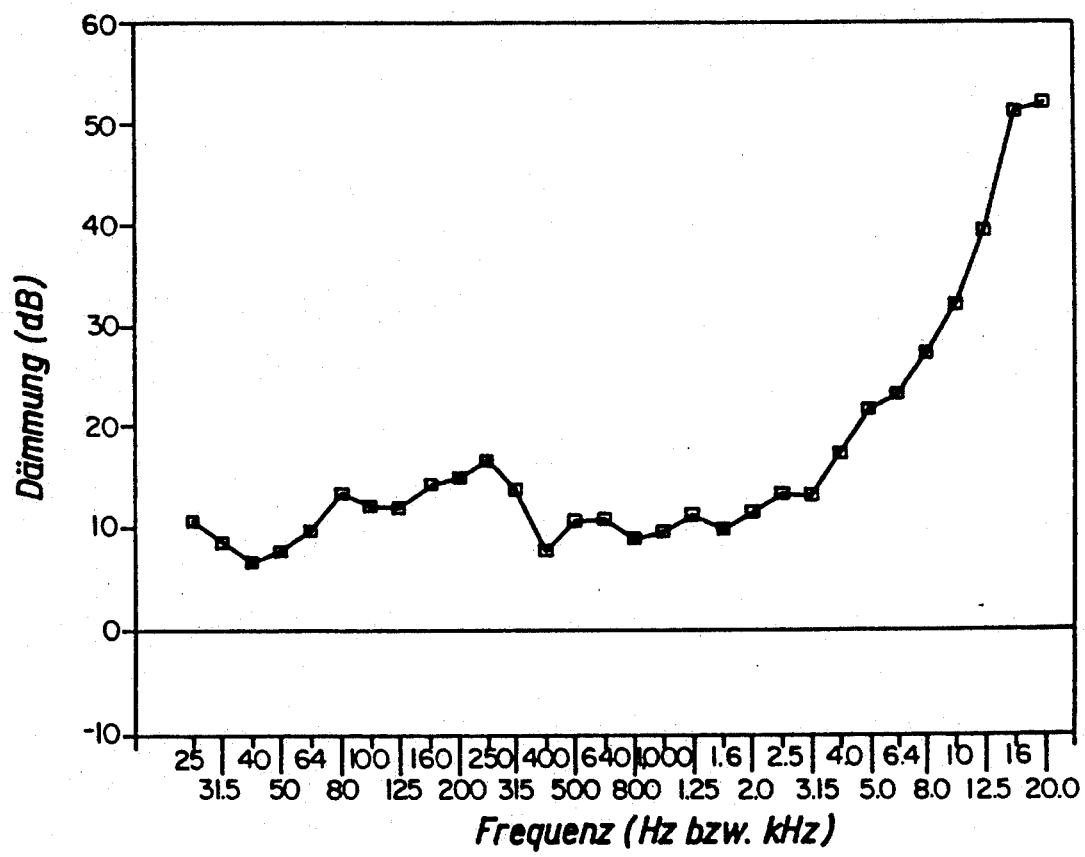
FIG. 4 is a measurement curve of the frequency-dependent insulating effect of a geometrically optimized composite structure according to the invention.

Another improvement in acoustic effectiveness, as shown in FIG. 4, is accomplished with a composite structure according to the invention that has triangular supporting elements. The insulating layer used for this measurement curve consists of a carrier layer with triangular supporting elements 13 and a cover layer, both made of PUR-900 with a Shore hardness of 50. This part of the insulating coating acts like an acoustic spring, and a carpet foamed onto this system acts as an acoustic mass. The total weight is once again 10 kg/m$^2$. This measurement curve shows no resonance-caused admittance and produces an insulating effect of 10 dB+3 dB over a broad range from 25 to 2500 Hz.

It will be understood that the changes made for frequency adaptation and optimization lie within the scope of knowledge of an individual skilled in the art. In particular, such changes consist in the deliberate selection of material data such as elasticity modulus, shear modulus, and loss factor. Changes in flow resistance can be achieved with the following parameters: thickness of the porous insulating system, height and base dimensions as well as surface quality of the cavities of the complex cavity labyrinth, and changes in the geometry of the supporting elements.

We claim:

1. A sound-insulating and sound-damping composite structure for reducing noise in a motor vehicle interior, comprising:

a bottom part vibratable to excite air to oscillate; and
an insulating coating having an anisotropic air flow resistance and resting loosely on said bottom part, said insulating coating being formed of an open-pored, relatively stiff material and having a first side adjacent to said bottom part and a second side adjacent to said first side, said first side including surface structures comprising a plurality of supporting ribs forming a plurality of open, hollow prism-shaped supporting elements, said supporting elements being spaced apart to define intersecting, open channels between them, and said intersecting open channels permitting air oscillating in said insulating layer in response to excitation by vibration of said bottom part to flow with considerably less hindrance parallel to said second side than perpendicular to said second side, to create said anisotropic air-flow resistance.

2. The composite structure of claim 1, wherein said insulating layer has a lowest natural frequency $$f_0 = \tfrac{1}{2}\pi \sqrt{E/d'm_F}$$

where said material forming said insulating layer has a modulus of elasticity E and a mass per unit area $M_F$, and said insulating coating has a thickness d, and wherein said material forming said insulating layer has a relatively high modulus of elasticity E, whereby said lowest natural frequency $f_0$ is relatively high.

3. The composite structure of claim 1 wherein said first side further includes a plurality of blocking ribs positioned transversely between said supporting ribs, said blocking ribs having a lower height than said supporting ribs.

4. The composite structure of claim 3, wherein said bottom part facing said first side of said insulating coating has a topography, and wherein said supporting ribs hve a height closely matching said topography of said bottom part, whereby said cover layer generally runs parallel to said bottom part.

5. The composite structure of claim 1, further comprising a coating on said bottom part facing said first side of said insulating coating.

6. The composite structure of claim 1, further comprising a decorative coating on said second side facing away from said first side.

7. The composite structure of claim 1, further comprising a protective layer adjacent said second side facing away from said first side.

8. A sound-insulating and sound-damping composite structure for reducing noise in a motor vehicle interior, comprising:
 a bottom part vibratable to excite air to oscillate; and
 an insulating coating having an anisotropic air flow resistance and resting loosely on said bottom part, said insulating coating having a carrier layer adjacent to said bottom part and a cover layer adjacent to said cover layer, said carrier layer being formed of a relatively stiff nonporous material, said cover layer being formed of an open-pored, relatively stiff material, said cover layer and said carrier layer differing in hardness, said carrier layer including surface structures comprising a plurality of supporting ribs forming a plurality of open, hollow prism-shaped supporting elements, said supporting elements being spaced apart to define intersecting, open channels between them, and said intersecting open channels permitting air oscillating in said insulating layer in response to excitation by vibration of said bottom part to flow with considerably less hindrance parallel to said cover layer than perpendicular to said cover layer, to create said anisotropic air-flow resistance.

9. The composite structure of claim 8, wherein said carrier layer further includes a plurality of blocking ribs positioned transversely between said supporting ribs, said blocking ribs having a lower height than said supporting ribs.

10. The composite structure of claim 9, wherein said bottom part facing said carrier layer of said insulating coating has a topography, and wherein said supporting ribs have a height closely matching said topography of said bottom part, whereby said cover layer generally runs parallel to said bottom part.

11. The composite structure of claim 8, further comprising a coating on said bottom part facing said carrier layer of said insulating coating.

12. The composite structure of claim 8, further comprising a decorative coating on said cover layer facing away from said carrier layer.

13. The composite structure of claim 8, further comprising a protective layer adjacent said cover layer facing away from said carrier layer.

14. A sound-insulating and sound-damping composite structure for reducing noise in a motor vehicle interior, comprising:
 a bottom part vibratable to excite air to oscillate; and
 an insulating coating having an anisotropic air flow resistance and resting loosely on said bottom part, said insulating coating being formed of an open-pored, relatively stiff material having a high modulus of elasticity and having a first side adjacent to said bottom part and a second side adjacent to said first side, said first side including surface structures comprising a plurality of supporting ribs forming a plurality of open, hollow prism-shaped supporting elements, said supporting elements being spaced apart to define intersecting, open channels between them, and said second side including a foamed structure, said supporting ribs and said second side in the vicinity of said supporting ribs deforming in response to vibrations in said bottom part to produce vibration damping by viscoelastic losses in said insulating coating, and said intersecting open channels permitting air oscillating in said insulating layer in response to excitation by vibration of said bottom part to flow with considerably less hindrance parallel to said first side than perpendicular to said first side, to create an anisotropic air-flow resistance.

15. The composite structure of claim 14, wherein said insulating layer has a lowest natural frequency $$f_0 = \tfrac{1}{2}\pi \sqrt{E/d'm_f}$$

where said material forming said insulating layer has a modulus of elasticity E and a mass per unit area $m_F$, and said insulating coating has a thickness d, and wherein said material forming said insulating layer has a relatively high modulus of elasticity E, whereby said lowest natural frequency $f_0$ is relatively high.

16. The composite structure of claim 14, wherein said first side further includes a plurality of blocking ribs positioned transversely between said supporting ribs, said blocking ribs having a lower height than said supporting ribs.

17. The composite structure of claim 16, wherein said bottom part facing said first side of said insulating coating has a topography, and wherein said supporting ribs have a height closely matching said topography of said bottom part, whereby said cover layer generally runs parallel to said bottom part.

18. The composite structure of claim 14, further comprising a coating on said bottom part facing said first side of said insulating coating.

19. The composite structure of claim 14, further comprising a decorative coating on said second side facing away from said first side.

20. The composite structure of claim 14, further comprising a protective layer adjacent said second side facing away from said first side.

* * * * *